United States Patent [19]

Becker

[11] 4,192,007
[45] Mar. 4, 1980

[54] PROGRAMMABLE RINGING GENERATOR

[75] Inventor: Dustin J. Becker, Rocky River, Ohio

[73] Assignee: Lorain Products Corporation, Lorain, Ohio

[21] Appl. No.: 910,685

[22] Filed: May 30, 1978

[51] Int. Cl.² ...................... H03B 19/00; G06F 15/20
[52] U.S. Cl. .................................. 364/721; 179/17 E; 328/14
[58] Field of Search ................... 364/721; 235/92 FQ; 179/17 E, 18 HB; 328/14, 15; 84/1.01

[56] References Cited

U.S. PATENT DOCUMENTS

| | | | |
|---|---|---|---|
| 3,391,253 | 7/1968 | Grandmaison | 179/17 E X |
| 3,735,269 | 5/1973 | Jackson | 328/14 |
| 3,743,755 | 7/1973 | Watson | 84/1.01 |
| 3,772,681 | 11/1973 | Skingle | 328/14 X |
| 3,821,714 | 6/1974 | Tomisawa et al. | 84/1.01 X |
| 3,824,498 | 7/1974 | McBride | 332/9 R |
| 3,898,446 | 8/1975 | Vatz | 364/721 X |
| 3,927,266 | 12/1975 | Stewart et al. | 179/17 E X |
| 3,976,945 | 8/1976 | Cox | 328/14 |
| 4,039,806 | 8/1977 | Fredriksson et al. | 364/721 |
| 4,039,951 | 8/1977 | Bruce et al. | 328/14 X |

*Primary Examiner*—Jerry Smith
*Attorney, Agent, or Firm*—William J. Clemens; Michael M. Rickin

[57] ABSTRACT

An apparatus for generating a selected one of a plurality of ringing frequencies utilizing a single frequency source. A first counting means is utilized to divide the source frequency by a first predetermined integer to generate a series of address signals at a rate proportional to the selected ringing frequency. A read only memory is responsive to the address signals for generating a series of values representing points along a sine wave form such that, as the first counting means continuously cycles to a maximum count total equal to the number of values stored in the read only memory, the sine wave form is repetitively generated. If the source frequency is not an integer multiple of the selected frequency, the first integer is selected to generate the closest higher frequency and a second counting means is utilized to increase the time required for the first counting means to generate all of the address signals for one cycle of the sine wave form. The second counting means divides the first counting means output frequency by a second predetermined integer to generate signals to disable the first counting means for at least one count each. The second integer is selected to obtain the number of missed counts of the first counting means which will result in an actual cycle time as close to the selected cycle time as possible.

24 Claims, 6 Drawing Figures

PROGRAMMABLE RINGING GENERATOR

BACKGROUND OF THE INVENTION

1. Field of the Invention

The present invention concerns digital frequency synthesizers in general and a programmable ringing generator in particular.

2. Description of the Prior Art

Prior art ringing generators were of the discrete component, magnetic type. A separate ringing generator was required for each ringing frequency to be generated. Thus, a five party line required five separate ringing generators each generating an output wave form at a different predetermined frequency. A time multiplex interrupter was then utilized to sequence the generators enabling the one corresponding to the phone to be rung. Such a system generated an excessive amount of heat requiring additional space and equipment for cooling and required a duplicate back-up system in case of failure. Furthermore, the generators were difficult to tune and were heat sensitive causing the output frequency to drift. In an attempt to solve these problems, a programmable ringing generator which digitally synthesized the ringing frequencies was investigated.

Digital frequency synthesizers generate discrete values of a sinusoidal wave form at a selected rate to determine the frequency at which the wave form is generated. The two basic methods for generating these values are recursively and non-recursively. Recursive digital synthesizers examine the different equations relating sinusoidal outputs to previously computed outputs wherein the equations are obtained by applying Z-transformation techniques to the Laplace transform of the output. However, one problem with this type of synthesizer is that the round-off errors associated with each iteration tend to build up and become unbounded. Thus, some type of error compensation must be included in the system.

The non-recursive type of synthesizer does not have this error build up. Typically, the system accesses discrete, quantized samples of a digitized sinusoidal wave form stored in an addressable memory such as a read only memory (ROM). The sample values are then applied to a digital-to-analog converter to generate a stepped sinusoidal wave form which can be smoothed with a filter. However, since the storage is not infinite but is limited to X words of Y bits each, some error will occur which is constant and will not build up.

SUMMARY OF THE INVENTION

The present invention concerns an apparatus for digitally synthesizing frequencies which is adapted for use as a ringing generator in telephone systems. The apparatus includes a pulse train generator fixed at a predetermined frequency which is higher than the highest frequency in a range of frequencies to be synthesized. A first counting means is utilized to divide the pulse train frequency by a predetermined first integer to generate a series of address signals at a rate proportional to a frequency selected from the range of ringing frequencies. A read only memory (ROM) is responsive to each of the address signals for generating a digital value at one point in a sinusoidal wave form such that, as the first counting means repetitively cycles to a maximum count total equal to the number of stored values, the sinusoidal wave form is repetitively generated. The digital values are applied to a digital-to-analog converter to generate a stepped sinusoidal wave form which is then pulse width modulated to generate driving signals to an output circuit.

If the pulse train generator frequency is not an integer multiple of the selected ringing frequency, the first counting means integer is selected to generate the next higher frequency and a second counting means is utilized to increase the time required for the first counting means to generate all of the address signals for one cycle of the sinusoidal wave form. The second counting means divides the first counting means output frequency by a second predetermined integer to generate signals to disable the first counting means for at least one count each. The second integer is selected to obtain the number of missed counts of the first counting means which will result in an actual cycle time as close to the cycle time of the selected frequency as possible.

The pulse train generator, counters and ROM can be implemented in either discrete elements or a microcomputer. In the microcomputer embodiment, the microcomputer has an internal clock for generating a pulse train the frequency of which defines the instruction execution time or cycle time. A first register is loaded with a first predetermined integer number and is repetitively decremented to zero and then reloaded such that the time required to execute the appropriate instructions to decrement and reload defines the period between wave form values to be generated. Each time the first register is decremented to zero, an address is generated to a ROM in the microcomputer such that a wave form value is generated. If the frequency to be generated falls between frequencies which can be generated using successive integers, a second register is loaded with a second predetermined integer number representing the number of output values which are to be generated before a delay is added to reduce the frequency to the selected frequency.

The output from the D/A converter generated by either of the above-discussed embodiments is then pulse width modulated and split in two driving signals for a pair of power transistors. The power transistors are alternately switched to generate a sinusoidal wave form through a transformer. Circuits are also provided for delaying the driving signals to prevent shoot through and for limiting output current. A transistor which has been driven into saturation has many excess charge carriers which tend to maintain the collector current flow after the base signal is changed to the cutoff level. If the other transistor of the pair is turned on before the excess charge carriers are depleted, the reverse bias can cause an internal short across the base region known as shoot through.

It is an object of the present invention to reduce the complexity and cost and to increase the accuracy of digital frequency synthesizers.

It is another object of the present invention to improve the performance of telephone ringing generators.

DESCRIPTION OF THE PREFERRED EMBODIMENTS

Figure 1:
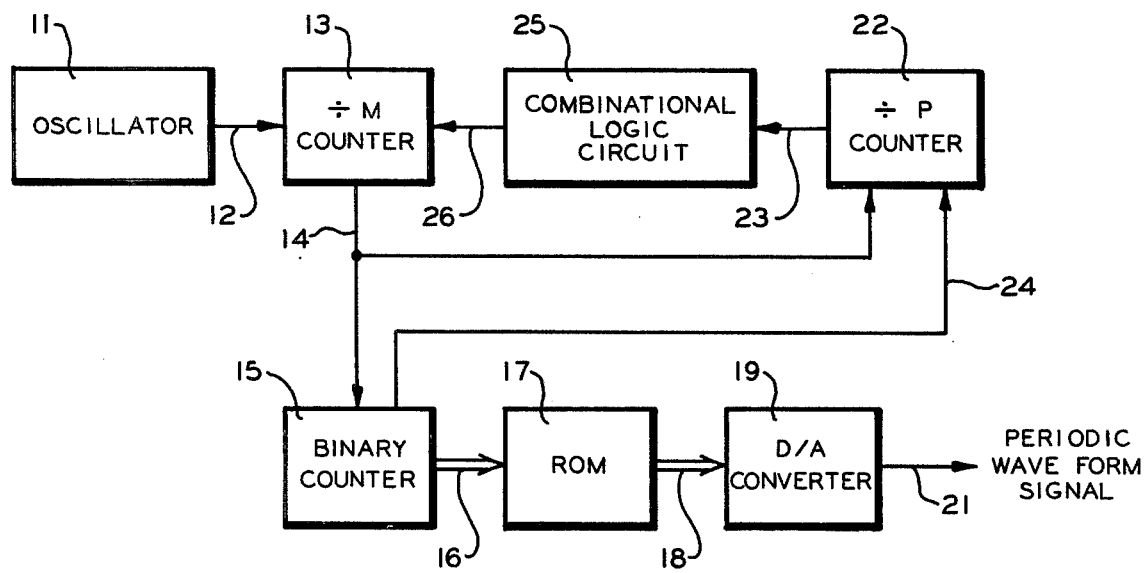
FIG. 1 is a block diagram of one embodiment of a digital frequency synthesizer for use in a telephone ringing system according to the present invention.

There is shown in FIG. 1 a block diagram of a system for generating a periodic wave form at a selected frequency according to the present invention. An oscillator 11 generates a pulse train signal on a line 12 which is an input to a programmable divide-by-M counter 13. The divide-by-M counter 13 generates an output pulse on a line 14 for every M input pulses on the line 12. The line 14 is connected as an input to a binary counter 15 which generates a binary count total on a plurality of lines 16. The binary count total is incremented one count for each pulse which appears on the line 14. The lines 16 are connected as address inputs to a read only memory (ROM) 17 which stores a series of digital values defining the periodic wave form which is to be generated. The size of the binary counter 15 is determined by the number of stored values in the ROM 17. For example, a ROM containing 256 digital values stored in binary would have eight address input lines and thus the binary counter 15 would be an eight bit counter. The stored digital value which is selected by the address signals on the lines 16 is generated on a plurality of output lines 18. The lines 18 are connected as an input to a digital-to-analog (D/A) converter 19 which converts the digitized signal on the lines 18 to analog form and generates this output signal on a line 21. As the binary counter is incremented, the D/A converter will generate a series of steps defining the wave form. When the counter 15 reaches its maximum count total, it returns to zero to begin a new cycle and the wave form is generated as a periodic wave form.

The line 14 is also connected as an input to a programmable divide-by-P counter 22 which generates an output pulse on a line 23 for each P input pulses on the line 14. The divide-by-P counter 22 also receives a reset signal on a line 24 from the binary counter 15 which generates the reset signal each time the binary count total on the lines 16 equals zero. The reset signal on the line 24 causes the count total of the divide-by-P counter 22 to be set to zero. The line 23 is connected to a combinational logic circuit 25 which generates control signals to the divide-by-M counter 13 on one or more lines 26. Each time the circuit 25 receives an output pulse from the counter 22, the circuit 25 will generate control signals on the lines 26 which inhibit the divide-by-M counter 13 such that it will not count a predetermined number of oscillator pulses on the line 12. For example, the circuit 25 can generate control signals on the lines 26 such that the divide-by-M counter 13 will miss one pulse on the line 12 for each pulse which appears on the line 23. If the selected frequency for the output signal on the line 21 falls between two frequencies which can be generated by dividing the oscillator frequency by adjacent values of M, the M which results in the higher output frequency is selected and a value is selected for P which adjusts the output frequency by periodically inhibiting the divide-by-M counter.

The following example will be utilized to illustrate the procedure used in the calculation of the variables M and P. Let:

$F_o$ = oscillator frequency.
$T_o$ = 1/$F_o$ = oscillator period
$F_d$ = desired frequency of periodic wave form.
$N$ = number of stored values for periodic wave form.

If $F_o$ = 400 KHz and $F_d$ = 54 Hz, then $T_o$ = 2.5 microseconds and $T_d$ = 18.519 milliseconds respectively. If $N$ = 256, the number of oscillator cycles per periodic wave form output value is calculated as follows:

$$T_d/(T_o \times N) = 18.519 \times 10^{-3}/(2.5 \times 10^{-6} \times 256)$$
$$= 28.936 \text{ cycles/output.}$$

The variable M is then set equal to the whole number portion of the above calculation. Thus, M = 28. If M = 28 and P = 0, the actual period of the wave form signal would be:

$$M \times T_o \times N = 28 \times 2.5 \times 10^{-6} \times 256 = 17.92 \text{ milliseconds}$$

and the actual frequency would be approximately 55.80 Hz, which is slightly higher than the desired frequency of 54 Hz.

In accordance with the present invention, the divide-by-P counter 22 is utilized in conjunction with the combinational logic circuit 25 to inhibit the divide-by-M counter 13 a predetermined number of counts at regular intervals such that the actual period is more closely related to the desired period. In the above example, 599 microseconds must be added to the actual period of the wave form in order for it to equal the desired period. Thus, the number of oscillator cycles which the divide-by-M counter must miss is:

$$C = 599 \times 10^{-6}/2.5 \times 10^{-6} = 239.6 \text{ cycles}$$

If these cycles are to be missed at regular intervals during a cycle of the periodic wave form, the interval is calculated as follows: $N/C = 256/239 = 1.07$. The variable P is then set equal to the above number. If the N/C calculation results in a number which contains a decimal portion such as 1.07, P is rounded to the nearest whole number. Thus, if P = 1, the divide-by-P counter 22 would generate a signal to the combinational logic circuit 25 which in turn causes the divide-by-M counter 13 to miss one count after every twenty-eight counts. If M = 28 and P = 1, the actual period of the wave form signal would be:

$$T_o \times N(M + 1/P) = 2.5 \times 10^{-6} \times 256(28 + 1/1)$$
$$= 18.56 \text{ milliseconds}$$

and the actual frequency would be 53.88 Hz, which is within a typical tolerance of one third Hz of the desired frequency. Where the present invention is utilized in a multi-party telephone ringing system, each ringing frequency will have an associated set of values for M and P and all frequencies would fall within the one third Hz tolerance. For example, if 42 Hz is desired, M = 37 and P = 5 will generate a 42.003 Hz signal.

For a desired frequency of 42 Hz the divide-by-M counter 13 generates an output pulse on line 14 for every 37 input pulses from oscillator 11 on line 12. Each pulse appearing on line 14 increments the binary counter 15 to thereby address successive locations in ROM 17. The pulse on line 14 is also connected to the input of divide-by-P counter 22 which generates an output pulse on line 23 for every five input pulses on the line 14. The output pulse on line 23 acts through combinational logic circuit 25 to cause divide-by-M counter 13 not to count a predetermined number of oscillator pulses. Prior to the generation of an output pulse by counter 22 the digital values representing the magnitude of the desired wave form are read out of ROM 17 and generated at equally spaced intervals of time. The generation of an output pulse by counter 22 causes the interval of time between the next generated digital value and the prior generated digital value to be longer in time than the equally spaced intervals of time between prior values. The amount of increase of the time interval is determined by the number of oscillator pulses not counted by the divide-by-M counter. Thus, for a desired frequency of 42 Hz, every sixth magnitude value is read out of ROM 17 at a time such that the period between this sixth magnitude value and the magnitude value immediately proceeding is longer than the period between other successive magnitude values.

Figure 2:
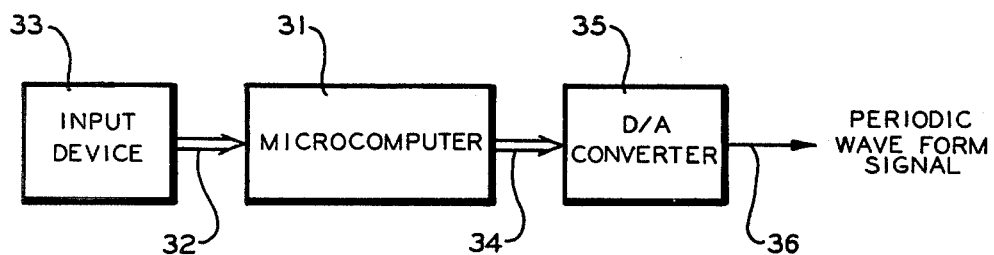
FIG. 2 is a block diagram of an alternate embodiment of a digital frequency synthesizer for use in a telephone ringing system according to the present invention.

There is shown in FIG. 2 a block diagram of an alternate embodiment of the present invention. A microcomputer 31 receives input signals on a plurality of input lines 32 from an input device 33. The input signals represent the frequency at which the periodic output wave form is to be generated and can also be used to control the magnitude of the output wave form. The microcomputer 31 can be an Intel 8048 microcomputer manufactured by the Intel Corporation, 3065 Bowers Avenue, Santa Clara, Calif. 95051. The 8048 microcomputer includes the following elements in a single forty pin package: an eight bit central processing unit (CPU), a read only memory (ROM) having one thousand locations of storage for eight bit words, a random access memory (RAM) having sixty-four locations of storage for eight bit words, twenty-seven input/output lines, an interval timer/event counter, an oscillator and clock driver, a reset circuit and an interrupt circuit.

The microcomputer 31 stores a series of magnitude values for the periodic wave form which is to be generated and a control program for generating these values at a selected rate such that the wave form is generated at a desired frequency. The digital values of the output wave form are generated on a plurality of output lines 34 to a digital-to-analog converter 35 which converts the digital values to an analog signal on an output line 36. The D/A converter 35 can be a model MC 1408 manufactured by Motorola, Inc. of Phoenix, Ariz.

Figure 3:
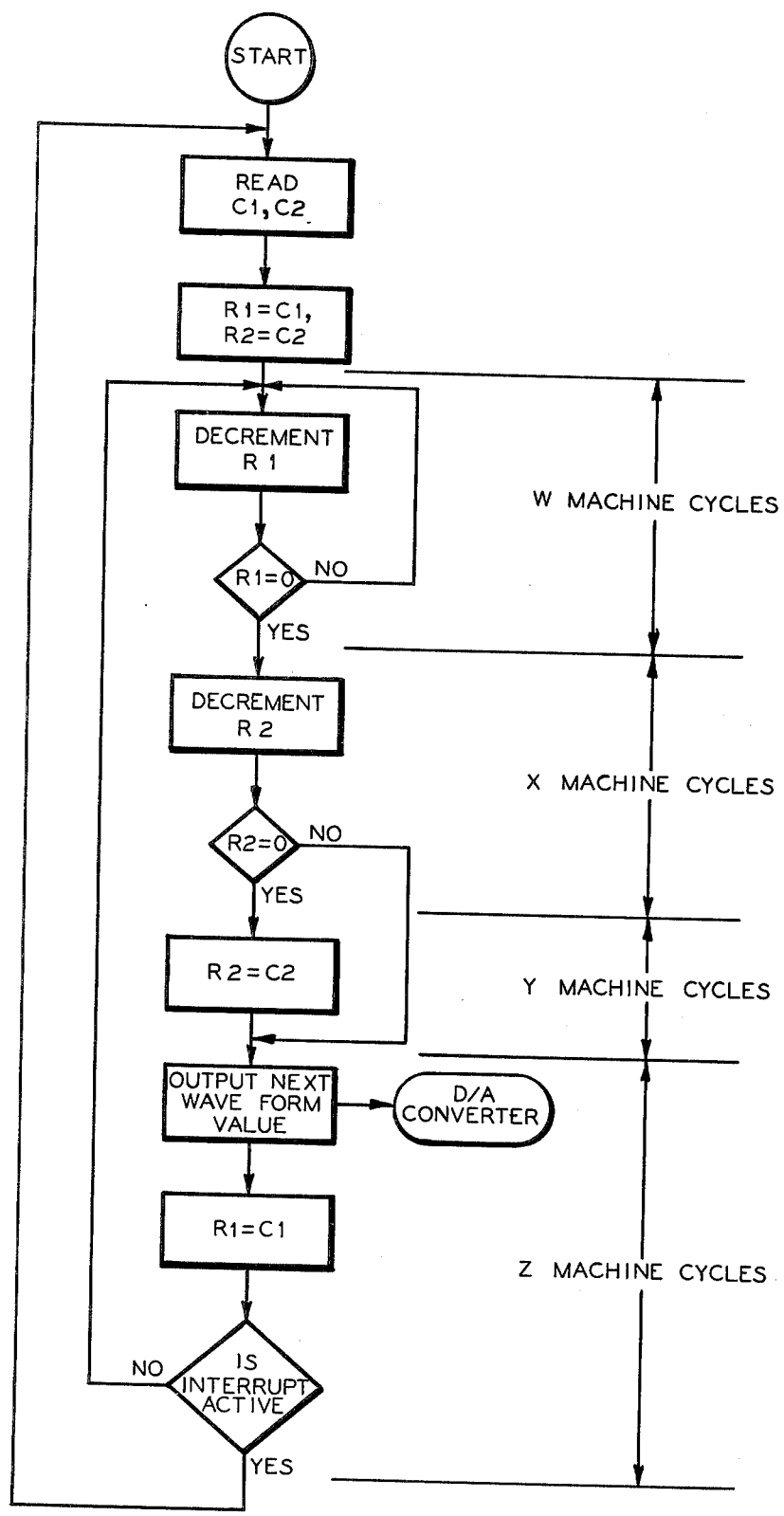
FIG. 3 is a flow diagram of the program utilized in the embodiment of FIG. 2.

There is shown in FIG. 3 a simplified flow diagram which will be utilized to describe the operation of the microcomputer 31. Typically, the microcomputer includes an oscillator or clock for generating a pulse train which controls the execution of each instruction. The length of time of one oscillator cycle or the period of the oscillator pulse train is known as a machine cycle. For example, a microcomputer having a clock which generates a pulse train at a frequency of 400 KHz would have a machine cycle equal to 2.5 microseconds. Computer instructions typically differ in the number of machine cycles which are required for their execution. For example, the instruction set of the Intel 8048 microcomputer includes instructions each requiring either one or two machine cycles for execution.

The microcomputer 31 generates the digitized output values of the periodic wave form in a manner similar to that of the system shown in FIG. 1. The computer clock corresponds to the oscillator 11 while a pair of internal registers correspond to the divide-by-M counter 13 and the divide-by-P counter 22. In FIG. 3, the program is initiated at a circle "START" and immediately enters a processing function "READ C1, C2" which includes instructions for reading the values C1 and C2. The value of C1 defines the time between wave form values and the value of C2 defines the number of wave form values to be generated before adding time to reduce the frequency. The values C1 and C2 can be entered by means of the input device 33 or they can be stored in memory and the input device can be used to select the specific locations in memory which are to be used. The procedure for calculating the values of C1 and C2 will be discussed subsequent to the discussion of the flow diagram of FIG. 3.

After reading the values of C1 and C2, the program enters a processing function "R1=C1, R2=C2" which includes instructions for setting a pair of internal computer registers equal to the values of C1 and C2. The program then enters a processing function "DECREMENT R1" which includes instructions for decrementing the R1 register count total by one count. Next, the program enters a decision point "R1=0" to check whether the R1 register has been decremented to zero. If the R1 register is not at zero, the program branches at "NO" back to the processing function "DECREMENT R1." The program will remain in this loop for C1 counts which is approximately the time between successive generations of new wave form values. This time is a function of the number of instructions, the number of machine cycles required to execute each instruction and the machine cycle time as determined by the internal clock. When R1=0, the program branches at "YES" to a processing function "DECREMENT R2" which includes instructions for decrementing the R2 register by one count.

After decrementing the R2 register, the program enters a decision point "R2=0" to check whether the R2 register count total has been decremented to zero. If the count total is zero, the program branches at "YES" to a processing function "R2=C2" which includes instructions for resetting the R2 register to C2. Next, the program enters a processing function "OUTPUT NEXT WAVE FORM VALUE" which includes instructions for reading the next wave form value from memory and outputting that value on the lines 34 to the D/A converter. If the R2 register count total is not equal to zero, the program branches from the decision point "R2=0" at "NO" to the processing function "OUTPUT NEXT WAVE FORM VALUE". The function of the R2 register is similar to the function of the divide-by-P counter shown in FIG. 1, i.e., to periodically insert a delay in the generation of the wave form values to increase the period and decrease the frequency of the wave form which would be generated utilizing only the R1 register. Thus, the "OUTPUT NEXT WAVE FORM VALUE" processing function is executed at a rate which will generate a wave form at a frequency within the tolerance of the desired frequency.

After the next wave form value is outputted, the program enters a processing function "R1=C1" which includes instructions for resetting the R1 register equal to C1. Next, the program enters a decision point "IS INTERRUPT ACTIVE" which includes instructions to check whether an interrupt has been generated. Typically an interrupt is generated to turn off the ringing generator, change the control word to select a new frequency and output voltage magnitude. At the end of the interrupt the generator turns back on. In a multi-party ringing system such as a five party line, the five frequencies are generated in a series of repeating cycles with an interrupt being generated at regular intervals to change the output frequency to the next one in the series. If no interrupt is present, the program branches at "NO" to return to the processing function "DECREMENT R1" such that the microcomputer will continue to generate the periodic wave form values at the same frequency. If an interrupt is present, the program branches at "YES" to return to the processing function "READ C1, C2" to read the values for the new wave form.

The following example will be utilized to illustrate the procedure used in the calculation of the variables C1 and C2.

Let:
Fc = microcomputer clock frequency
Tc = 1/Fc = microcomputer clock period = machine cycle
Fd = desired frequency of periodic wave form
Td = 1/Fd = desired period of periodic wave form
N = number of stored values for periodic wave form
W = number of machine cycles required to execute the instructions in performing the "DECREMENT R1" and "R1=0" steps
X = number of machine cycles required to execute the instructions in performing the "DECREMENT R2" and "R2=0" steps
Y = number of machine cycles required to execute the instructions in performing the "R2=C2" step
Z = number of machine cycles required to execute the instructions in performing the "OUTPUT NEXT WAVE FORM VALUE," "R2=C1" and "IS INTERRUPT ACTIVE" steps In the following numerical calculations, let us assume that:
Fc = 400 KHz
Tc = 2.5 microseconds
Fd = 54 Hz
Td = 18.519 milliseconds
N = 256
W = 3
X = 4
Y = 2
Z = 14

The desired period of the periodic wave form can be represented by the following relationship:

$$Td = Tc \times N((C1 \times W) + X + (Y/C2) + Z)$$

Since the R2 register will always be decremented to zero at least once during each cycle of the wave form, the variable C1 can be determined by letting C2 equal N in the above relationship. Thus, $$Td = Tc \times N((C1 \times W) + X + Y/N + Z)$$

and $$C1 = (Td/(Tc \times N) - X - Y/N - Z)/W$$

By substituting the numerical values in the above expression, we obtain:

$$C1 = (18.519 \times 10^{-3}/(2.5 \times 10^{-6} \times 256) - 4 - 2/256 - 14)/3 = 3.645$$

Since C1 is used to set the R1 register which in turn functions as a counter, C1 must be a whole number. Thus, the decimal portion of the above calculated value is dropped such that C1=3. If the above calculation of C1 would have initially resulted in a whole number, no additional machine cycles would have to be added by means of the "R2=C2" step, and the variable C2 would have a value of two hundred fifty-six.

After determining the variable C1, we can now determine the value of C2 by returning to the expression for Td and solving it for C2. Hence, $$C2 = Y/(Td/(Tc \times N) - (C1 \times W) - X - Z)$$

By substituting the numerical values in the above expression for C2, we obtain:

$$C2 = 2/(18.519 \times 10^{-3}/(2.5 \times 10^{-6} \times 256) - (3 \times 3) - 4 - 14) = 1.033$$

The value of C2, like C1, must also be a whole number since it is used to set the R2 register which in turn functions as a counter. Since the above calculation of C2 resulted in number containing a decimal portion, C2 has to be rounded to the nearest whole number which is one. In this case, the actual frequency is not equal to the selected frequency but the relationship between the clock frequency and the range of frequencies to be generated is such so as to enable the output signal to be generated at a frequency within a preselected tolerance about the selected frequency. Thus, with C1=3 and C2=1, the actual period of the wave form signal would be:

$$Tc \times N((C1 \times W) + X + (Y/C2) + Z) = 2.5 \times 10^{-6} \times 256((3 \times 3) + 4 + (2/1) + 14) = 18.56 \text{ milliseconds}$$

and the actual frequency would be approximately 53.88 Hz which is slightly lower than the desired frequency of 54 Hz. Where the present invention is utilized in a multi-party telephone ringing system, each ringing frequency will have an associated set of values for C1 and C2 and all frequencies would fall within the one third Hz tolerance. For example, if 42 Hz is desired, C1=6 and C2=2 will generate a 42.23 Hz signal.

In summary, the microcomputer, under the control of the program shown in FIG. 3, changes its output signal from one stored wave form value to the next after the expiration of a predetermined number of machine cycles. The predetermined number of machine cycles is determined by the number (C1) of times the program runs through the R1 register loop at W machine cycles per loop, X machine cycles to decrement the R2 register, Y machine cycles divided by the number (C2) of times the program runs through the R2 register loop and Z machine cycles to output the wave form value, reset the R1 register and check for an interrupt. This is accomplished by inserting the Y machine cycles once every C2 wave form values.

Figure 4:
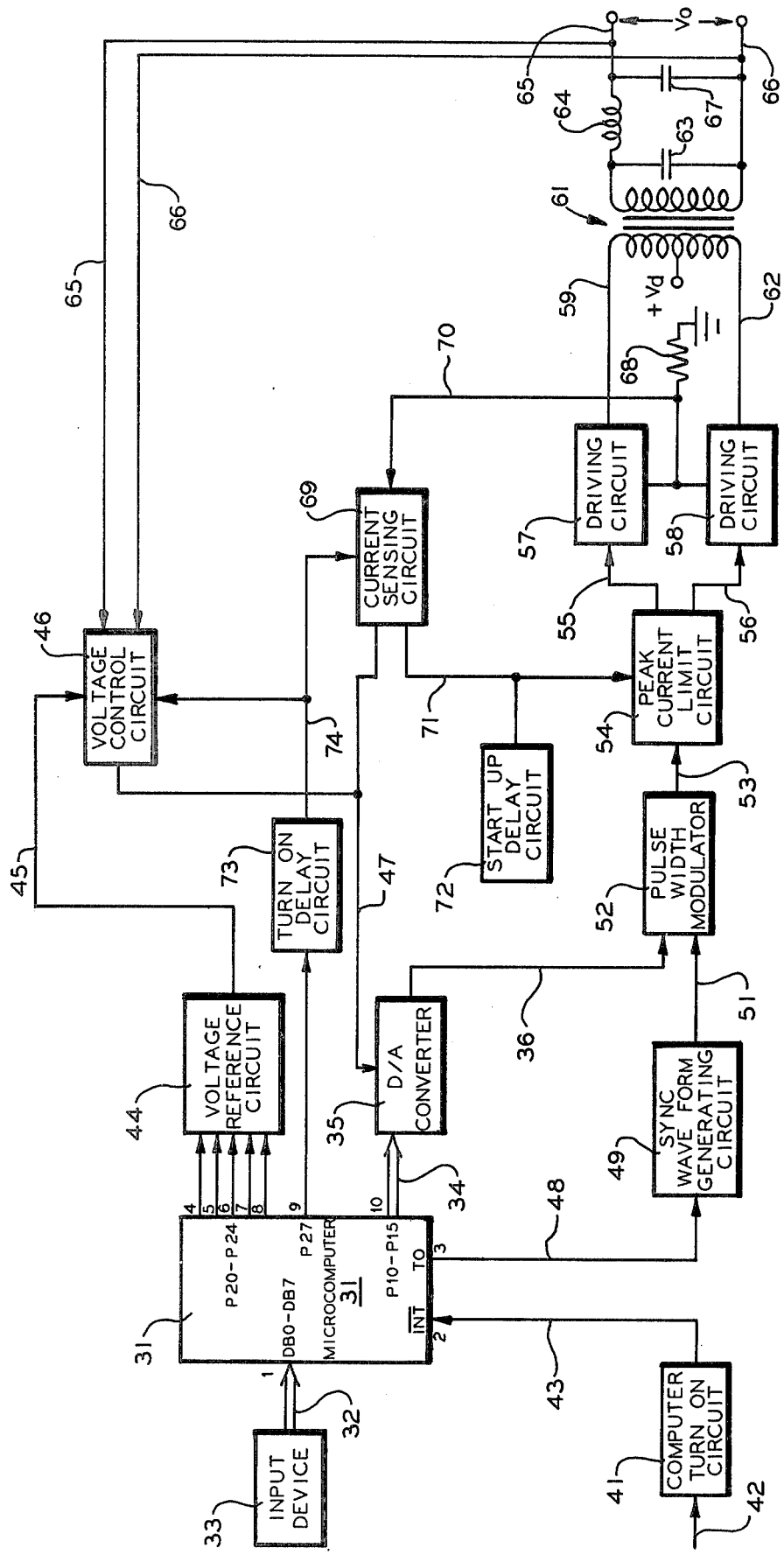
FIG. 4 is a partial block diagram, partial schematic of a programmable ringing generator including the embodiment of FIG. 2 with control circuits according to the present invention.

There is shown in FIG. 4 a block diagram of a system utilizing the elements of the system shown in FIG. 2 for generating a periodic wave form at a selected one of a plurality of predetermined frequencies. The system can also generate the periodic wave form at a selected one of a plurality of predetermined RMS voltages. More specifically, the system in FIG. 4 can be adapted for use as a multi-frequency telephone ringing generator system. The circuits of this system are shown in greater detail in FIGS. 5a and 5b.

The microcomputer 31 has a group of eight data terminals (DB0–DB7) 31-1 connected to receive the input signals on the lines 32 from the input device 33. Typically, the microcomputer 31 is programmed with the periodic wave form values, the control programs and the data necessary to generate the wave form at the selected frequencies and RMS voltages. The input device is used to select the particular frequency and RMS voltage at which the wave form is to be generated. A turn on circuit 41 receives a control signal on a line 42 and generates a turn on signal to an interrupt input (INT) 31-2 which signals the microcomputer to read the data on the terminals 31-1. As will be discussed, a ground level signal on the line 42 generates a signal at or near ground potential to the input 31-2 which causes the microcomputer 31 to read the data at the input terminals 31-1.

A group of five quasi-bidirectional port terminals (P20–P24) 31-4 through 31-8 are programmed as outputs to generate control signals to a voltage reference circuit 44. The ports are called quasi-bidirectional because of an output circuit structure which allows each line to serve as an input, an output, or both. Data written to the ports is statically latched and remains unchanged until rewritten. Each line is continuously pulled up to a positive five volt level so as to be a source for a logic "1" but also can be pulled low by an external circuit thus allowing the same pin to be used for both input and output. Program instructions determine whether data is written to or read from the lines. The circuit 44 generates a voltage reference signal on a line 45 to a voltage control circuit 46. As will be discussed, the voltage reference circuit 44 generates a selected one of five different RMS reference voltages in accordance with the control signals received from the microcomputer 31.

A group of six quasi-bidirectional port terminals (P10–P15) 31-10 are programmed as outputs and connected to the lines 34 to transmit the digitized periodic wave form values to the D/A converter 35. The D/A converter 35 generates the stepped, digitized wave form signal on the line 36 at a magnitude which is determined by a voltage control signal received from the circuit 46 or the circuit 69 on a line 47.

A clock output terminal (TO) 31-3 is connected to a line 48 to generate a clock reference signal to a sync wave form generating circuit 49. The clock reference signal has an integer relationship to the internal clock which defines the machine cycle time. The circuit 49 generates a sync wave form on a line 51 to one input of a pulse width modulator 52. The other input of the modulator 52 is connected to receive the stepped, digitized periodic wave form signal on the line 36.

The microcomputer 31 generates a pulse, at a frequency proportional to the internal clock frequency to snychronize the pulse width modulator 52, at the output 31-3 each time a new wave form value is generated at the outputs 31-10 to the D/A converter 35. As will be discussed, the circuit 49 utilizes the pulse train on the line 48 to generate a triangular wave form on the line 51. The triangular wave form is used by the modulator 52 to modulate the periodic wave form signal on the line 36 such that the modulator 52 generates a pulse width modulated (PWM) signal on a line 53. The PWM signal on the line 53 comprises pulses of a fixed amplitude with durations modulated by the signal on the line 36. Specifically, the duration of the pulses corresponds to the amplitude of the wave form signal on the line 36.

A peak current limit circuit 54 receives the PWM signal on the line 53 as an input. The circuit 54 splits the PWM signal into two signals of opposite polarity and generates drive signals on a pair of lines 55 and 56 to driving circuits 57 and 58 respectively. The drive signals alternately switch a power transistor (shown in FIG. 5b) in each of the driving circuits 57 and 58 and are generated with dead time during which both transistors are turned off to prevent shoot through. The driving circuits 57 and 58 function to amplify the PWM signal. The driving circuit 57 has an output line 59 connected to one terminal of a center tapped primary winding of a transformer 61. The driving circuit 58 has an output line 62 connected to the other terminal of the primary winding. The center tap terminal of the primary winding is connected to a Vd positive potential power supply (not shown).

A secondary winding of the transformer 61 is connected in parallel with a capacitor 63. A choke 64 is connected between one terminal of the secondary winding and one output voltage line 65. Another output voltage line 66 is connected to the other terminal of the secondary winding. A capacitor 67 is connected between the output lines 65 and 66. The capacitors 63 and 67 and the choke 64 collectively function as a low pass filter to recover the original periodic wave form signal, smooth it and generate this signal across the lines 65 and 66.

The lines 65 and 66 are connected as inputs to the voltage control circuit 46. The circuit 46 senses the output voltage Vo and generates the voltage control signal to the D/A converter 35 such that the RMS value of the output voltage Vo will not exceed the desired magnitude represented by the voltage reference signal on the line 45. The Vo voltage is scaled down and compared with the voltage reference signal to generate an error signal represented by the voltage control signal.

The driving circuits 57 and 58 are both connected to the circuit ground potential through a resistor 68. A current sensing circuit 69 receives an input signal on a line 70 which signal represents the voltage across the resistor 68. This voltage is directly proportional to the current being supplied by the driving circuits 57 and 58. If this current exceeds a predetermined limit the circuit 69 will generate a current limit signal on a line 71 to the peak current limit circuit 54 which in turn removes the driving signals from the lines 55 and 56 to prevent overloading the driving circuits. As will be discussed, the signal on the line 71 is typically at a logic "1" positive potential except when the current limit is exceeded. At this time the signal switches to logic "0" at the circuit ground potential and this causes the logic circuitry included in the circuit 54 (shown in FIG. 5b) to stop generating the one of the drive signals being generated on one of the lines 55 and 56. As each drive signal is alternately generated, it is immediately terminated as long as the line 71 is at logic "0". When the current through the resistor 68 falls below the predetermined limit, the current limit signal on the line 71 will switch to logic "1" and circuit 54 will not prematurely terminate the generation of the drive signals on the lines 55 and 56.

In order to prevent an undesirable output voltage signal when power is initially supplied to the components of the system shown in FIG. 4, a start up delay circuit 72 is connected to the line 71. When the power is initially turned on, the circuit 72 will maintain the line 71 at logic "0" or ground potential for a predetermined amount of time before switching to logic "1". This permits the circuit components to be brought up to power and reduces the probability of undesirable voltage signals appearing on the output lines 65 and 66.

The current sensing circuit 69 is also connected to the line 47 to generate the voltage control signal to the D/A converter 35. The circuit 69 functions to reduce the output voltage of the wave form signal on the line 36 whenever the predetermined current limit of the driving circuits 57 and 58 has been exceeded. Thus, the voltage control signals generated by the circuits 46 and 69 are OR'ed on the line 47 with the more negative of the two being the input to the D/A converter 35.

A turn on delay circuit 73 is connected to a port output terminal (P27) 31-9 to receive a turn on signal. The circuit 73 generates a signal at a negative potential on the line 74 whenever the microcomputer 31 is off or interrupted. When the microcomputer is turned on, the circuit 73 delays a change of signal on the line 74 to prevent the voltage control circuit 46 from overdriving the driving circuits 57 and 58 which could create flux problems in the transformer 61.

Figure 5A:
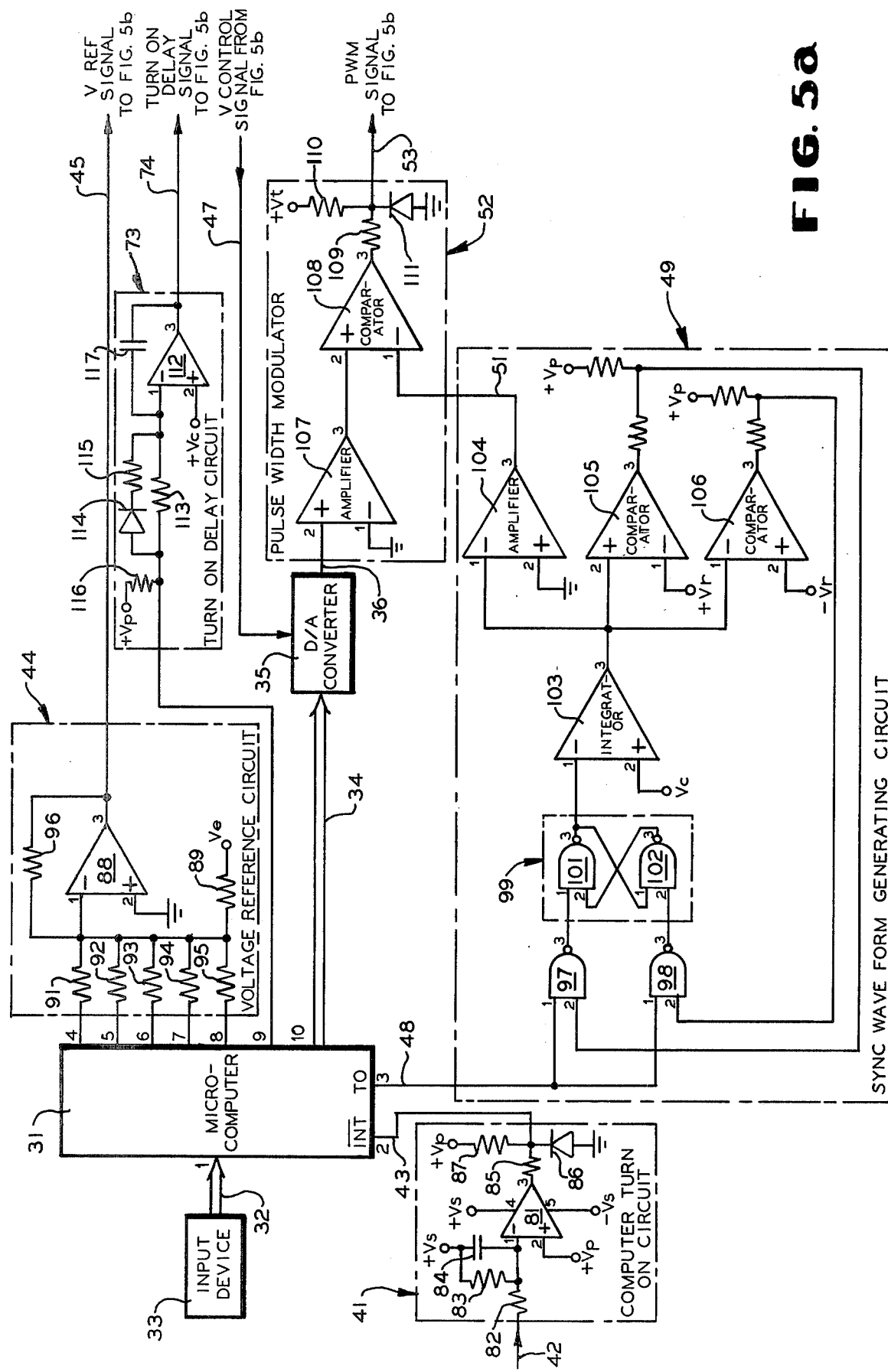
FIGS. 5a and 5b are schematic diagrams of the programmable ringing generator of FIG. 4.
Figure 5B:
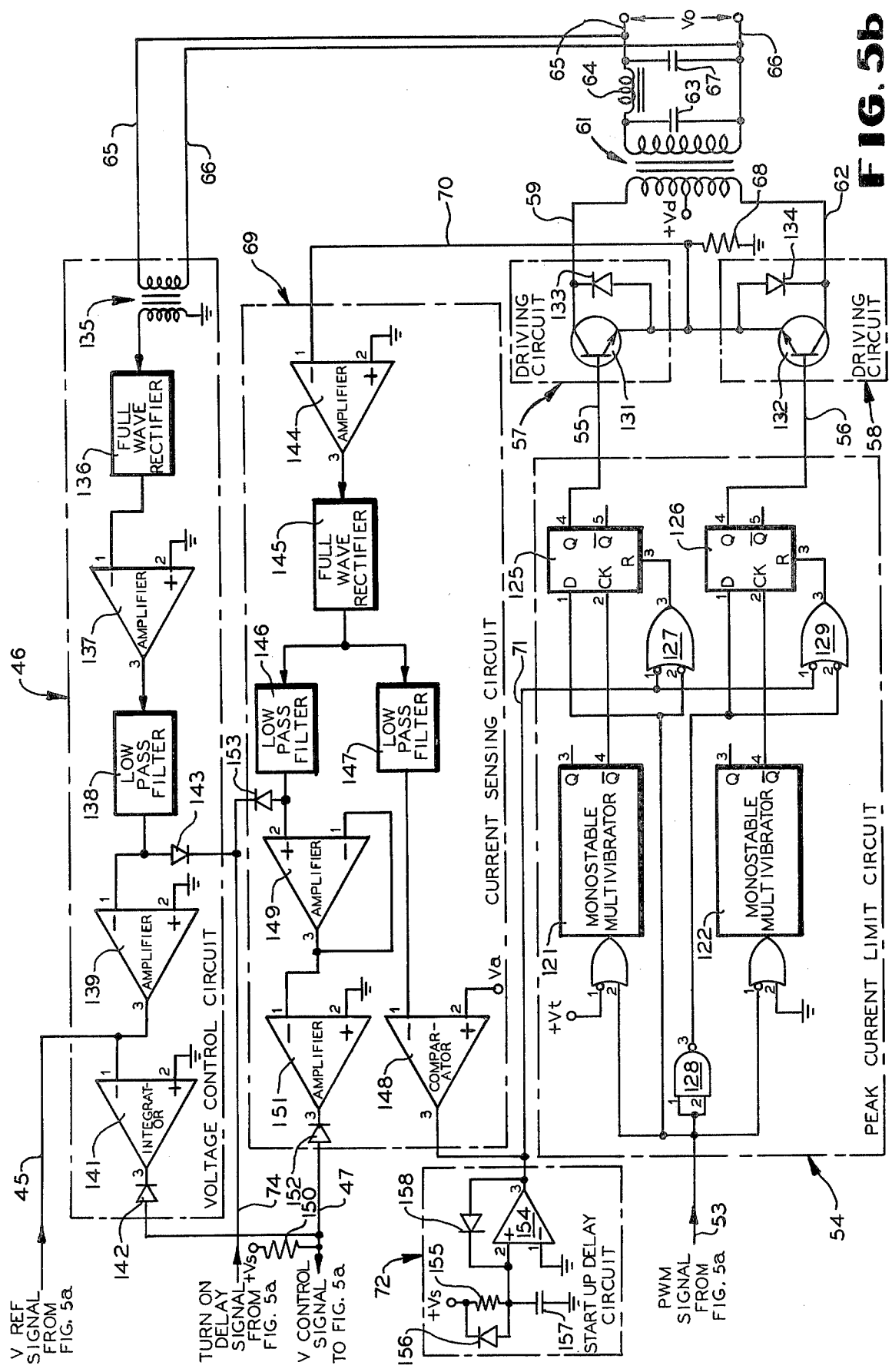

Referring to FIGS. 5a and 5b there is shown a more detailed partial block diagram, partial schematic of the system shown in FIG. 4. The computer turn on circuit 41 includes a voltage comparator 81 having an inverting input 81-1 connected to the input signal line 42 through a current limiting resistor 82. A resistor 83 and a capacitor 84 are connected in parallel between the input 81-1 and a Vs positive potential power supply (not shown wherein Vs is typically twelve volts). A non-inverting input 81-2 is connected to a Vp positive potential power supply (not shown wherein Vp is typically five volts). An output 81-3 is connected to the line 43 through a resistor 85 for generating the turn on signal to the microcomputer $\overline{INT}$ input 31-2. A positive potential power supply input 81-4 and a negative potential power supply input 81-5 are connected to a power supply (not shown) which typically generates power at positive and negative twelve volts. All comparators, amplifiers and integrators in FIGS. 5a and 5b will have power supply inputs similar to the inputs 81-4 and 81-5 and these inputs will not be shown to simplify the drawing.

When the microcomputer 31 is turned off, the line 42 is at logic "1" at or near the positive potential Vs. The comparator 81 will generate a negative potential signal at the output 81-3 at or near the negative potential power supply twelve volts. The line 43 is connected to the system ground potential through a diode 86 to maintain the $\overline{INT}$ input 31-2 at logic "0" representing the presence of an interrupt signal. The diode 86 has an anode connected to the system ground potential and a cathode connected to the line 43 to clamp line 43 at one diode drop below the system ground potential. When it is desired to turn on the microcomputer 31, a logic "0" signal is generated on the line 42 at or near the system ground potential. The comparator 81 will then switch its output to the positive potential signal at or near the positive twelve volts. The line 43 is connected to the Vs power supply through a resistor 87 to maintain the $\overline{INT}$ input line 31-2 at logic "1" representing the turn on signal as long as the line 42 is at logic "0".

The voltage reference circuit 44 includes an amplifier 88 having a non-inverting input 88-2 connected to the system ground potential and an inverting input 81-1 connected to a Ve power supply (not shown) through a resistor 89. The input 88-1 is also connected to the terminals (P20–P24) 31-4 through 31-8 through a plurality of resistors 91 through 95 respectively. A feedback resistor 96 is connected between an amplifier output 88-3 and the input 88-1. The output 88-3 is connected to generate the voltage reference signal on the line 45.

The circuit 44 is connected in manner such that five different RMS reference voltages can be generated on the line 45. The magnitude of the voltage Ve is selected to zero the output of the amplifier when no control signal is being generated by the microcomputer 31. Typically, a logic "0" or ground potential is generated at all but one of the output terminals 31-4 through 31-8. At the selected one of these terminals, a logic "1" or a positive potential is generated. The value of the resistor connected to the terminal at logic "1" in conjunction with the value of the resistor 96 determine the amplification and, therefore, the magnitude of the voltage reference signal on the line 45. The voltage reference signal will be a negative polarity signal with a magnitude corresponding to the scaled value of the desired RMS voltage of the periodic wave form. Thus, by using five different values for the resistors 91 through 95, the circuit 44 can generate voltages representing five different RMS voltages. It may be desirous in some situations to connect separate buffers between the resistors 91 through 95 and the respective microcomputer terminals to isolate the circuit 44 from the microcomputer 31.

The sync wave form generating circuit 49 includes a pair of NAND gates 97 and 98 having inputs 97-1 and 98-1 respectively connected to the line 48 to receive the clock output signal To. Outputs 97-3 and 98-3 are inputs to a flip flop 99 which includes a pair of NAND gates 101 and 102. The outputs 97-3 and 98-3 are connected to inputs 101-1 and 102-2 respectively while outputs 101-3 and 102-3 are connected to inputs 102-1 and 101-2 respectively. The output signal of the flip flop 99 is generated at the output 101-3 which is also connected to an inverting input 103-1 of an integrator 103. A non-inverting input 103-2 is connected to a Vc positive potential power supply (not shown).

An integrator output 103-3 is connected to an inverting input 104-1 of an amplifier having a non-inverting input 104-2 connected to the circuit ground potential. An amplifier output 104-3 is connected to the line 51. The integrator output 103-3 is also connected to a non-inverting input 105-2 and to an inverting input 106-1 of a pair of comparators 105 and 106 respectively. An inverting input 105-1 is connected to a Vr positive potential power supply (not shown) while a non-inverting input 106-2 is connected to a Vr negative potential power supply (not shown). Outputs 105-3 and 106-3 are connected to inputs 97-2 and 98-2 of the NANDs 97 and 98 respectively.

As previously mentioned, the circuit 49 functions to generate a triangular wave form on the line 51 which is used to modulate the periodic wave form signal on the line 36. The NANDs 97 and 98 each function to generate a logic "0" at their outputs only when both of their inputs are at logic "1". The flip flop 99 generates a logic "1" at the output 101-3 after the input 101-1 has received a logic "0" pulse and generates a logic "0" at the output 101-3 after the input 102-2 has received a logic "0" pulse. The magnitude of Vc is typically located midway between the positive logic "1" potential and the ground logic "0" potential. Thus, the integrator 103 will generate a ramp signal at the output 103-3 with a negative slope when the input 103-1 is at logic "1" and with a positive slope when the input is at logic "0". The comparator 105 functions as a non-inverting comparator and is connected to the Vp power supply to generate a logic "1" at the output 105-3 whenever the magnitude of the signal at the input 105-2 is greater than the positive potential Vr reference voltage. The comparator 106 functions as an inverting comparator and is connected to the Vp power supply to generate a logic "1" at the output 106-3 whenever the magnitude of the signal at the input 106-1 is less than the negative potential Vr reference voltage. The positive potential Vr reference voltage can be generated, for example, by passing the negative potential Vr reference voltage through an inverting amplifier with unity gain (not shown).

In operation, the integrator 103 will generate a negative slope ramp signal when the flip flop output 101-3 is at logic "1". When the voltage at the output 103-3 falls below the −Vr potential, the comparator 106 generates a logic "1" to the NAND input 98-2. The microcomputer 31 generates a train of alternating logic "1" and "0" pulses on the line 48. The next "1" clock pulse on the line 48 will enable the NAND 98 to generate a "0" to the flip flop input 102-2. The signal at the output 101-3 then switches to logic "0" and the integrator 103 begins to generate a positive slope ramp signal at the output 103-3. When the voltage at the output 103-3 exceeds the −Vr potential, the comparator 106 will switch back to "0" to disable the NAND 98.

When the voltage at the output 103-3 exceeds the +Vr reference voltage the comparator 105 generates a logic "1" to enable the NAND 97 at the input 97-2. The next "1" clock pulse on the line 48 will cause the NAND 97 to generate a "0" to the flip flop input 101-1. The signal at the output 101-3 switches to logic "1" and the integrator 103 begins to generate a negative slope ramp signal at the output 103-3. The above-described sequence then repeats itself. Thus, the alternating oppositely sloped ramp signals at the output 103-3 will form a triangular wave form which is inverted by the inverting amplifier 104 and supplied to the pulse width modulator 52 on the line 51.

The pulse width modulator 52 includes an amplifier 107 having a non-inverting input 107-2 connected to receive the periodic wave form signal on the line 36 and an inverting input 107-1 connected to the circuit ground potential. An amplifier output 107-3 is connected to a non-inverting input 108-2 of a comparator 108 having an inverting input 108-1 connected to receive the triangular wave form on the line 51. The PWM signal is generated at a comparator output 108-3 which is connected to the line 53 through a resistor 109. The line 53 is connected to a Vt positive potential power supply (not shown) through a resistor 110 and to the cathode of a clamping diode 111 having an anode connected to the system ground potential.

The amplifier 107 functions to amplify the signal on the line 36 so that the magnitude range of the periodic wave form at the output 107-3 is such that it can be pulse-width modulated by the signal on the line 51. The comparator 108 functions to generate the PWM signal at a logic "1" which is a positive potential Vt whenever the magnitude of the signal at the input 108-2 exceeds the magnitude of the signal at the input 108-1. Otherwise, the comparator 108 generates a logic "0" at the system ground potential. When the PWM signal is at logic "1", the signal is supplemented by the Vt power supply through the resistor 109 and, when the PWM signal is at logic "0", the signal is held at one diode drop below ground potential by the diode 111.

The turn on delay circuit 73 includes an amplifier 112 having an inverting input 112-1 connected to the microcomputer port output terminal 31-9 through a resistor 113 and a non-inverting input 112-2 connected to the Vc power supply. A diode 114 having an anode connected to the port output terminal 31-9 is connected in series with a resistor 115 between the terminal 31-9 and the amplifier input 112-1. A resistor 116 is connected between the terminal 31-9 and the Vp power supply. A capacitor 117 is connected between the input 112-1 and an output 112-3 which is connected to generate the turn on delay signal on the line 74.

The circuit 73 functions to generate a signal on the line 74 at the −Vs potential when the microcomputer is performing its start-up functions such as reading the frequency and RMS voltage data from the input device. As will be discussed, a −Vs potential signal on the line 74 prevents the circuits 46 and 69 of FIG. 5b from generating a voltage control signal on the line 47 to the D/A converter 35.

The microcomputer 31 generates a positive Vp potential at the output 31-9 when it is desired to inhibit the circuits 46 and 69. The amplifier 112 integrates the signal generated by the microcomputer 31. The Vc potential is typically between the positive Vp potential and the circuit ground potential. Thus, if a Vp potential is generated at the output 31-9, the amplifier 112 generates a negative slope ramp signal at the output 112-3 until the amplifier becomes saturated at a predetermined lower limit which is typically at the twelve volt negative potential. The amplifier 112 will continue to generate the negative potential signal at the output 112 until the output 31-9 switches to the ground potential. When the signal at the output 31-9 switches to the ground potential signal, the amplifier 112 generates a positive slope ramp signal at the output 112-3 until the amplifier becomes saturated at its upper limit which is typically at the twelve volt positive potential. The output 112-3 will remain at this positive potential until the output 31-9 switches to the positive Vp potential. It should be noted that the resistance value of the resistor 115 is typically much smaller than the resistance value of the resistor 113. This results in the negative slope ramp signal being generated with a steeper slope than the positive slope ramp signal. Thus, a ground to Vp potential transition at the output 31-9 will cause the amplifier 112 to become saturated more rapidly than a Vp potential to ground transition.

The peak current limit circuit 54 shown in FIG. 5b includes a pair of monostable multivibrators 121 and 122. The multivibrator 121 has an inverting input 121-1 connected to the Vt power supply and a non-inverting input 121-2 connected to the line 53. The multivibrator 122 has an inverting input 122-1 connected to the line 53 and a non-inverting input 122-2 connected to the system ground potential. A pair of non-inverting outputs 121-3 and 122-3 are not utilized and, therefore, are not connected. An inverting output 121-4 is connected to a clock input 125-2 of a D type flip flop 125 and an inverting output 122-4 is connected to a clock input 126-2 of a D type flip flop 126. A NAND gate 127 has an input 127-1 connected to the line 71, an input 127-2 connected to the line 53 and an output 127-3 connected to a flip flop reset input 125-3. A NAND 128 has a pair of inputs 128-1 and 128-2 connected to the line 53 and functions as an inverter for the PWM signal. A NAND 129 has an input 129-1 connected to the line 71, and input 129-2 connected to an output 128-3 of the NAND 128 and an output 129-3 connected to a flip flop reset input 126-3. The flip flop 125 has a data input 125-1 connected to the line 53 and a non-inverting output 125-4 connected to the line 55. The flip flop 126 has a data input 126-1 connected to the output 128-3 and a non-inverting output 126-4 connected to the line 56. A pair of inverting outputs 125-4 and 126-5 are not utilized and, therefore, are not connected.

The circuit 54 functions to split the PWM signal into two drive signals for driving the circuits 57 and 58 and introduces a dead time each time the drive signal switches between "on" and "off" states to prevent shoot through due to output transistor storage time. The circuit 54 will also limit the current that can be generated by the driving circuits 57 and 58 in response to the current limit signal generated by the current sensing circuit 69 on the line 71.

When the PWM signal switches from "0" to "1", the monostable multivibrator 121 is triggered to generate a "0" pulse of a predetermined duration at the output 121-4 which defines a delay time. When the PWM signal switches from "1" to "0", the monostable multivibrator 122 is triggered to generate a "0" pulse of a predetermined duration at the output 122-4 which also defines a delay time. Thus, as the PWM signal is generated as a series of "0" and "1" pulses, the multivibrators introduce a delay time prior to the clocking of the flip flops 125 and 126.

When the PWM signal on the line 53 switches from "0" to "1", a "1" is applied to the flip flop data input 125-1 and to the NAND input 127-2. If we assume that the line 71 is at "1", the NAND 127 will generate a "0" to enable the flip flop 125 to be clocked. The multivibrator responds to the transition on the line 53 by generating a "0" pulse to the clock input 125-2. After a delay of the duration of the "0" pulse, the flip flop 125 is clocked by the "0" to "1" transition to generate a "1" at the output 125-4 and on the line 55. The "0" to "1" transition on the line 53 generates a "1" to "0" transition from the NAND 128 to generate a "1" from the NAND 129. The "1" from the NAND 129 resets the flip flop output 126-4 to "0" which is generated on the line 56. Thus, the signal on the line 56 is changed to "0" at the beginning of the delay pulse and the signal on the line 55 is changed to "1" at the end of the delay pulse so that both drive signals are not at "1" at the same time.

When the PWM signal switches from 1"1" to "0", a "0" is applied to the NAND 127 which generates a "1" to reset the flip flop output 125-4 to "0" on the line 55. At the same time, the NAND 128 generates a "1" to the NAND 129 which generates a "0" to enable the flip flop 126 to be clocked. The multivibrator 122 responds to the transition on the line 53 by generating a "0" pulse to the clock input 126-2. After a delay of the duration of the "0" pulse, the flip flop 126 is clocked by the "0" to "1" transition to generate a "1" at the output 126-4 and on the line 56. Thus, the signal on the line 55 is changed to "0" at the beginning of the delay pulse and the signal on the line 56 is changed to "1" at the end of the delay pulse so that both drive signals are not at "1" at the same time.

The driving circuits 57 and 58 include NPN transistors 131 and 132 which are typically power transistors having collectors connected to the lines 59 and 62 respectively and emitters connected to the line 70. The bases of the transistors 131 and 132 are connected to receive the drive signals on the lines 55 and 56 respectively. A pair of diodes 133 and 134 have cathodes connected to the lines 59 and 62 respectively and anodes connected to the line 70.

When the driving signal on the line 55 is at logic "1", the transistor 131 is in the on state and current flows from the Vd power supply through one half of the primary winding to the line 59 and then through the transistor 131 and the resistor 68 to the system ground. When the signal on the line 55 switches to "0", the transistor 131 is turned off and there is a dead time before the driving signal on the line 56 switches to "1" to turn on the transistor 132. When the transistor 132 is turned on, current flows from the Vd power supply through the other half of the primary winding to the line 62 and then through the transistor 132 and the resistor 68 to the circuit ground. It should be noted that, if the transistors 131 and 132 require a larger driving current signal than can be generated by either of the flip flops 125 or 126, an intermediate amplifier stage such as a Darlington pair amplifier can be connected between the D flip flop and the respective driving circuit. The dead time between "1" signals allows depletion of the excess charge carriers in the transistors to prevent shoot through whereby reverse polarity shorts the transistor.

The output signals generated by the driving circuits 57 and 58 are magnetically coupled to the secondary winding of the transformer 61. As previously mentioned, the secondary winding is connected to the pair of filter capacitors 63 and 67 and the choke 64 which collectively function as a low pass filter to recover the periodic wave form signal from the amplified PWM signal. The demodulated periodic wave form appears as the voltage Vo across the output lines 65 and 66.

The output voltage Vo is sensed by the voltage control circuit 46 which includes a transformer 135 having a pair of primary winding terminals connected to the output lines 65 and 66. A secondary winding of the transformer 135 has one terminal connected as an input to a full wave rectifier 136 and the other terminal connected to the system ground potential. The transformer 135 functions to reduce or scale the magnitude of the Vo output signal and the rectifier 136 generates a positive rectified output signal to an inverting input 137-1 of an inverting amplifier 137 having a non-inverting input 137-2 connected to the system ground potential. The amplifier 137 generates an amplified and inverted rectified wave form at an output 137-3 to an input of a low pass filter 138. The filter 138 includes a capacitor (not shown) which is charged to a negative potential which is representative of the actual RMS voltage of the wave form on the output lines 65 and 66. This signal is applied to an inverting input 139-1 of an amplifier 139 having a non-inverting input connected to the system ground potential. The amplifier 139 is typically set for unity gain such that the amplifier 139 functions to invert the negative potential at the input 139-1 to a positive potential at an output 139-3 which is connected to an inverting input 141-1 of an integrator 141 having a non-inverting input connected to the system ground potential. The input 141-1 is also connected to receive the RMS voltage reference signal on the line 45 while an output 141-3 generates the voltage control signal on the line 47 through a diode 142 having an anode connected to the line 47 and a cathode connected to the output 141-3.

The signal at the output 139-3 representing the scaled actual RMS voltage is combined with the RMS reference voltage signal on the line 45 to generate an input signal to the integrator 141. If the reference and scaled actual RMS voltages are equal, the input 141-1 will be at the ground potential such that the integrator 141 generates a ground potential signal on the line 47 to the D/A converter 35 of FIG. 5a which maintains the output signal at its present level. If the scaled actual RMS voltage is greater than the reference RMS voltage, the input 141-1 is at a positive potential and the amplifier generates a negative potential control signal to the D/A converter 35 on the line 47 which causes the D/A converter to reduce the voltage level of its output signal. If the RMS reference voltage is greater than the scaled actual RMS voltage, the input 141-1 is at a negative potential and the positive signal at the output 141-3 is blocked by the diode 142 and therefore not supplied to the D/A converter 35. Thus, the diode 142 permits OR'ing with a voltage control signal generated by the current sensing circuit 69.

A diode 143 has an anode connected to the input 139-1 and a cathode connected to receive the turn on delay signal on the line 74. When the line 74 is at the −Vs potential, the input 139-1 is pulled to −Vs such that the amplifier 139 generates a positive potential at the output 139-3. Thus, the input 141-1 is at a positive potential and, since the output 141-3 is negative, a voltage control signal is generated on the line 47 to prevent an overshoot of the output voltage.

The current sensing circuit 69 includes an amplifier 144 having a non-inverting input 144-2 connected to the ground potential and an inverting input 144-1 connected to the line 70 to receive a signal having a magnitude representing the current being generated by the driving circuits 57 and 58. The amplifier 144 amplifies and inverts the signal on the line 70 and generates this signal at an output 144-3 to a full wave rectifier 145 which in turn generates a positive potential rectified signal to a pair of low pass filters 146 and 147.

The filter 147 converts the positive rectified signal to a d.c. value which is applied to an inverting input 148-1 of a comparator 148 having a non-inverting input 148-2 connected to a Va potential power supply (not shown). The comparator output 148-3 is connected to generate the current limit signal on the line 71. The comparator 148 functions as an inverting comparator such that a logic "0" is generated at the output 148-3 whenever the magnitude of the signal at the input 148-1 exceeds the reference potential Va. Thus, when the signal on the line 70 reaches a magnitude which indicates that the driving circuits 57 and 58 are being overloaded, the comparator 148 generates a logic "0" on the line 71 to the NAND gates 127 and 129. This causes the NANDs 127 and 129 to reset flip flops 125 and 126 which in turn shuts off the one of the transistors 131 and 132 which is turned on. The other transistor is turned on at the normal time but will be shut off in a similar manner if the overload is still present. The circuit will continue to operate in this manner until normal operation is resumed.

The low pass filter 146 converts the positive rectified signal to a d.c. value which is applied to a non-inverting input 149-2 of an amplifier 149. An inverting input 149-1 is connected to an output 149-3 such that the amplifier 149 functions as a voltage follower. The output 149-3 is also connected to an inverting input 151-1 of an amplifier 151 having a non-inverting input 151-2 connected to the system ground potential. An amplifier output 151-3 is connected to the cathode of a diode 152 having an anode connected to the line 47. As the current through the resistor 68 increases, the magnitude of the positive polarity signal at the input 151-1 increases such that a negative polarity voltage control signal is fed back to D/A converter 35 on the line 47. This signal causes the D/A converter to reduce the magnitude of the wave form signal on the line 36. The diode 152 and the diode 142 permit OR'ing of the voltage control signals generated by the circuits 69 and 46 respectively such that the D/A converter 35 responds to the more negative of the two signals.

It should be noted the low pass filter 146 typically includes a capacitor (not shown) having a much larger capacitance value than the capacitor (not shown) which is included in the low pass filter 147. Thus, when there is an increase in current through the resistor 68, the voltage across the capacitor in the filter 147 will change more rapidly than the voltage across the capacitor in the filter 146. Hence, the comparator 148 will generate the current limit signal on the line 71 prior to the amplifier 151 generating the voltage control signal on the line 47. The line 47 is also connected to the positive potential Vs power supply through a resistor 150 to signal the D/A converter 35 to increase the output voltage magnitude when both of the circuits 46 and 69 are generating positive potential signals.

As discussed above, both the voltage control circuit 46 and the current sensing circuit 69 function to limit the magnitude of the output voltage Vo. The current sensing circuit 69 generates a voltage control signal on the line 47 to reduce the voltage magnitude while maintaining the shape of the wave form. The circuit 69 also generates a current limit signal on the line 71 which will cause the peak current limit circuit 54 to clip the top of each half cycle of the wave form when the current generated by the driving circuits 57 and 58 exceeds a predetermined maximum indicating that the output voltage magnitude is too high.

A diode 153 has an anode connected to the input 149-2 and a cathode connected to receive the turn on delay signal on the line 74. When the line 74 is at the −Vs potential, the input 149-2 is pulled to −Vs and the amplifier 149 generates a signal to the input 151-1 such that a voltage control signal is generated on the line 47. Thus, the system can start up without a voltage overshoot.

The start up delay circuit 72 functions to generate the start up delay signal on the line 71 at or near the circuit ground potential until the Vs power supply has been brought up to power. The circuit 72 includes an amplifier 154 having a non-inverting input 154-2 connected to the Vs power supply (not shown) through a resistor 155 and an inverting input 154-1 connected to the circuit ground potential. A diode 156 has an anode connected to the input 154-2 and a cathode connected to the Vs power supply while a capacitor 157 is connected between the input 154-2 and the system ground potential. A diode 158 has a cathode connected to the input 154-2 and an anode connected to an output 154-3 which is connected to the line 71.

When the Vs power supply is in the off state, the capacitor 157 is at the ground potential and the line 71 is pulled to ground through the diode 158. Thus, both flip flop reset inputs 125-3 and 126-3 will be at "0" and no drive signals will be supplied to the driving circuits 57 and 58. When the Vs power supply is initially turned on, the flip flops inputs 125-3 and 126-3 will remain at logic "0" until the capacitor 157 has charged to a positive potential sufficient to generate a logic "1" signal on the line 71.

The above-described invention can be utilized as a multiparty ringing generator in a telephone system. The program shown in FIG. 3 can be repetitively executed for a series of input words (C1, C2) to generate a plurality of ringing frequencies, each frequency being generated for a predetermined time period and the order of generation being repeated. The values of C1 and C2 are selected to generate ringing frequencies which are as close to the desired ringing frequencies as possible with a given relationship between the frequency of the microcomputer internal clock and the range of desired ringing frequencies. In any range of desired ringing frequencies there can be a great variance in the number of delay counts which must be introduced to generate a frequency within a predetermined tolerance of the desired ringing frequency.

In summary, the present invention concerns an apparatus for generating a periodic wave form at a selected one of a plurality of frequencies. Such an apparatus is particularly suited for use as a ringing generator in a telephone system. The apparatus comprises a source of clocking signals generated at a predetermined frequency; a first counting means for repetitively counting a first predetermined number of said clocking signals; a second counting means for repetitively counting a second predetermined number of times said first counting means counts said first predetermined number of said clocking signals and for delaying for a predetermined time the counting of said first counting means in response to the counting of said second predetermined number of times said first counting means counts said first predetermined number of said clocking signals; and means for storing a series of magnitude values defining at least a portion of one cycle of the periodic wave form, said storage means being responsive to each time said first counting means counts said first predetermined number of said clocking signals for generating a successive one of said magnitude values to define the periodic wave form at the selected frequency.

In one embodiment, the first counting means includes a first dividing counter means for generating a pulse in response to the counting of said first predetermined number of said clocking signals and a counter means responsive to said first dividing counter means pulses for accumulating a pulse count total representing the number of times said first dividing counter means counts to said first predetermined number. The second counting means includes a second dividing counter means for generating a pulse in response to the counting of said second predetermined number of said first dividing counter means pulses and wherein said first dividing counter means is responsive to each of said second dividing counter means pulses for delaying its counting for a predetermined time.

In an alternate embodiment, the apparatus includes a microcomputer programmed with a series of program instructions. The microcomputer includes a means generating a clock pulse train at a predetermined frequency which defines the execution time of each of said program instructions; a first counting means for repetitively counting a first predetermined number of times a first portion of said series of program instructions is executed; a second counting means for repetitively counting a second predetermined number of times said first counting means counts said first predetermined number wherein the counting of said second counting means delays for a predetermined time the counting of said first counting means; and means for storing a series of magnitude values defining at least a portion of one cycle of the periodic wave form, said storage means being responsive to each time said first counting means counts to said first predetermined number to generate a successive one of said magnitude values whereby said periodic wave form is generated at the selected frequency.

The present invention also concerns a method of generating a periodic wave form at a frequency selected from a plurality of frequencies. The steps comprise: storing a series of magnitude values representing points along at least a portion of one cycle of the periodic wave form; generating clocking signals at a predetermined frequency higher than the selected frequency; repetitively counting a first predetermined number of said clocking pulses; repetitively generating said series of magnitude values, one of said magnitude values being generated each time said first predetermined number of clocking signals is counted; repetitively counting a second predetermined number of times said first predetermined number is counted; and delaying the counting of said clocking signals for a predetermined period of time each time said second number of times is counted.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. In an apparatus for generating a plurality of magnitude values defining a periodic wave form at a predetermined selected frequency the period between predetermined ones of said magnitude values being variable according to a predetermined sequence comprising:

(a) a source of clocking signals generated at a predetermined frequency;

(b) a first counting means responsive to said clocking signals for repetitively counting a first predetermined number of said signals said first counting means generating a first signal when said first predetermined number is counted;

(c) means for storing said plurality of magnitude values, said storage means being responsive to said first signal for generating successive ones of said magnitude values; and (d) a second counting means responsive to said first signal for repetitively counting a second predetermined number of said first signals, said second predetermined number being the number of times said first counting means counts said first predetermined number of said clocking signals, said second counting means generating upon the occurance of said second predetermined number a count inhibiting signal to said first counting means, said first counting means responsive to said inhibiting signal to inhibit for a predetermined number of clocking signals the counting of said first counting means, whereby the period between predetermined ones of said generated magnitude values is varied according to the predetermined sequence.

2. An apparatus according to claim 1 wherein said first and second predetermined numbers are integers.

3. An apparatus according to claim 1 wherein said first counting means includes a first dividing counter means for generating a pulse in response to the counting of said first predetermined number of said clocking signals and a counter means responsive to said first dividing counter means pulses for accumulating a pulse count total representing the number of times said first dividing counter means counts to said first predetermined number of said clocking signals.

4. An apparatus according to claim 3 wherein said accumulating counter means is a binary counter.

5. An apparatus according to claim 3 wherein said second counting means includes a second dividing counter means for generating a pulse in response to the counting of said second predetermined number of said first dividing counter means pulses and wherein said first dividing counter means is responsive to each of said second dividing counter means pulses for delaying its counting for a predetermined time.

6. An apparatus according to claim 3 wherein said storing means includes a read only memory for storing each of said magnitude values at separate addressable storage locations, said read only memory being responsive to said counter means pulse count total for generating one of said magnitude values.

7. An apparatus according to claim 1 including a microcomputer programmed to generate said magnitude values by repetitively executing a series of program instructions, said microcomputer including said clocking signals source having means for generating a clock pulse train at a predetermined frequency which defines the execution time of each of said program instructions, wherein the repetitive execution of a first portion of said series of program instructions generates said clocking signals; said first counting means having a first register for counting said predetermined number of said clocking signals; said second counting means having a second register for counting said second predetermined number of times said first register counts said first predetermined number of said clocking signals; and said storage means having a read only memory for storing said magnitude values.

8. A ringing generator for generating a plurality of magnitude values defining at least a portion of one cycle of a periodic wave form having a frequency selected from a plurality of predetermined frequencies, the period between predetermined ones of said magnitude values being variable according to a predetermined sequence comprising:
  a. a microcomputer programmed with a series of program instructions and including;
  b. a means generating a clock pulse train at a first predetermined frequency which defines the execution time of each of said program instructions;
  c. a first counting means responsive to said clock pulse train for repetitively counting a first predetermined number of times a first portion of said series of program instructions is executed;
  d. means for storing said series of magnitude values defining at least a portion of one cycle of said periodic wave form said storage means being responsive to each time said first counting means counts to said first predetermined number to generate a successive one of said magnitude values; and
  e. a second counting means for repetitively counting a second predetermined number of times said first counting means counts said first predetermined number, wherein upon the occurrence of said second predetermined number the counting of said first counting means is inhibited for a predetermined number of clock pulses, whereby the period between predetermined ones of said generated magnitude values is varied according to the predetermined sequence.

9. A ringing generator according to claim 8 wherein said first counting means includes a first register which is repetitively loaded with a count total representing said first predetermined number and wherein said first portion of said series of program instructions includes an instruction for decrementing said count total.

10. A ringing generator according to claim 8 wherein said second counting means includes a second register which is repetitively loaded with a count total representing said second predetermined number and wherein said series of program instructions includes an instruction for decrementing said count total.

11. A ringing generator according to claim 8 wherein said storage means is a read only memory.

12. A ringing generator according to claim 8 including means responsive to said magnitude values for generating the periodic wave form as an analog signal.

13. A ringing generator according to claim 12 including means responsive to said analog signal for generating a pulse width modulated signal, means responsive to said pulse width modulated signal for generating a pair of driving signals and means responsive to said driving signals for generating the periodic wave form to a load.

14. A ringing generator according to claim 13 including means responsive to a predetermined maximum current magnitude of the periodic wave form for controlling said means for generating said driving signals.

15. A ringing generator according to claim 13 including means responsive to the voltage magnitude of the periodic wave form for controlling said means for generating an analog signal whereby the periodic wave form is generated at a predetermined voltage magnitude.

16. A ringing generator according to claim 15 including means for generating a signal representing a voltage magnitude selected from at least two predetermined voltage magnitudes and wherein said voltage control means is responsive to said selected magnitude signal for controlling said analog signal generating means whereby the periodic wave form is generated at said selected voltage magnitude.

17. A method for generating a plurality of magnitude values defining a periodic wave form at a frequency selected from a plurality of frequencies the period between predetermined ones of said magnitude values being variable according to a predetermined sequence comprising the following steps:
  a. storing a series of magnitude values representing points along at least a portion of one cycle of the periodic wave form;
  b. generating clocking signals at a predetermined frequency higher than the selected frequency;
  c. repetitively counting a first predetermined number of said clocking signals;
  d. repetitively generating said series of said magnitude values one of said magnitude values being generated each time said first predetermined number of clocking signals is counted;
  e. repetitively counting a second predetermined number of times said first predetermined number is counted; and f. inhibiting for a predetermined number of clocking signals the counting of said clocking signals each time said second number of times is counted, whereby the magnitude values defining the periodic wave form at the selected frequency are generated with the period between predetermined ones of said magnitude values variable according to the predetermined sequence.

18. A method according to claim 17 including the step of determining said first predetermined number by selecting the integer portion of the number obtained by dividing said clocking signals predetermined frequency by the selected frequency and the number of said magnitude values defining one cycle of the periodic wave form.

19. A method according to claim 18 including the step of determining said second predetermined number by selecting the integer portion of the number obtained by dividing the number of said magnitude values defining one cycle of the periodic wave form by said clocking signal predetermined frequency and the difference between the period of one cycle of the selected frequency and one cycle of the frequency obtained by performing steps a through d.

20. A ringing generator for generating a periodic wave form to a load comprising:
   a source of direct current power;
   driving means for alternately connecting and disconnecting said power source and the load in response to driving signals;
   a source of a signal having a characteristic representing the magnitude of the periodic wave form;
   means responsive to said magnitude signal for generating said driving signals; and
   means for generating a current limit signal representing the magnitude of the current flowing from the power source through said driving means wherein said driving signals generating means is responsive to said current limit signal for terminating the generation of said driving signals to limit the current flowing through said driving means to a predetermined maximum value.

21. A ringing generator according to claim 20 wherein said magnitude signal source includes means for generating said magnitude signal as a pulse width modulated signal, the width of each pulse representing the desired voltage magnitude of the periodic wave form, and wherein said driving signals generating means includes means responsive to each pulse of said pulse width modulated signal for initiating the generation of one of said driving signals and responsive to said current limit signal for terminating the generation of said one driving signal.

22. A ringing generator according to claim 21 wherein said means for initiating and terminating the generation of said one driving signal is a bistable device which is set in response to each pulse of said pulse width modulated signal and reset in response to said current limit signal.

23. A digital frequency synthesizer for generating a series of discrete values in digital form at a selected rate to define a wave form the period between predetermined ones of said discrete values being variable according to a predetermined sequence comprising:
   a. a source of clocking signals generated at a predetermined frequency;
   b. a first counting means for repetitively counting a first predetermined number of said clocking signals;
   c. a second counting means for repetitively counting a second predetermined number of times said first counting means counts said first predetermined number of said clocking signals and for inhibiting for a predetermined number of clocking signals the counting of said first counting means when said second counting means counts said second predetermined number; and
   d. means for storing a series of digital magnitude values defining at least a portion of one cycle of the wave form, said storage means being responsive to each time said first counting means counts said first predetermined number of said clocking signals for generating a successive one of said digital magnitude values to define the wave form at a frequency determined by the selected rate, the selected rate being determined by said clocking signals source predetermined frequency and said first and second predetermined numbers, whereby the period between predetermined ones of said generated discrete values as varied according to the predetermined sequence.

24. A digital frequency synthesizer according to claim 23 including a microcomputer programmed to generate said digital magnitude values by repetitively executing a series of program instructions, said microcomputer including said clocking signals source having means for generating a clock pulse train at a predetermined frequency which defines the execution time of each of said program instructions wherein the repetitive execution of a first portion of said series of program instructions generates said clocking signals; said first counting means having a first register for counting said predetermined number of said clocking signals; said second counting means having a second register for counting said second predetermined number of times said first register counts said first predetermined number of said clocking signals; and said storage means having a read only memory for storing said digital magnitude values.

* * * * *